United States Patent [19]

Rifkin

[11] Patent Number: 5,088,276
[45] Date of Patent: Feb. 18, 1992

[54] TURBO-COMPRESSOR ENGINE

[76] Inventor: Frank Rifkin, 111 Lincoln Park East, Cranford, N.J. 07016

[21] Appl. No.: 434,316

[22] Filed: Nov. 13, 1989

[51] Int. Cl.$^5$ .............................................. F02C 3/14
[52] U.S. Cl. .................................... 60/39.41; 60/731
[58] Field of Search ................... 60/39.36, 39.41, 731, 60/39.5

[56] References Cited

U.S. PATENT DOCUMENTS

| | | | |
|---|---|---|---|
| 2,623,356 | 12/1952 | Coanda | 60/39.41 |
| 2,924,937 | 2/1960 | Liebach | 60/39.36 |
| 3,369,361 | 2/1968 | Craig | 60/39.41 |
| 3,613,360 | 10/1971 | Howes | 60/39.36 |
| 3,613,361 | 10/1971 | Rifkin | 60/39.41 |
| 3,898,793 | 8/1975 | Nakamura et al. | 60/39.08 |

Primary Examiner—Louis J. Casaregola
Attorney, Agent, or Firm—Auslander & Thomas

[57] ABSTRACT

The engine described herein is adapted for a continuous supply of compressed gases and includes a first and second compressor mounted on a common shaft with a turbine. The air which enters the engine is compressed by the first compressor and passed into a combustion chamber, wherein it is mixed with fuel and the mixture is ignited. Resulting combustion products are conveyed to the turbine which is driven thereby and are further compressed by the second compressor. The compressed exhaust is led into an exhaust chamber via openings provided in an end plate, at which the common shaft supporting the compressors and the turbine terminates.

7 Claims, 2 Drawing Sheets

TURBO-COMPRESSOR ENGINE

BACKGROUND OF THE INVENTION

Field of the Invention

The present invention relates to an internal combustion engine of the turbo-compressor type. More particularly, the present invention relates to improvements of the internal combustion engine disclosed in applicant's U.S. Pat. No. 3,613,361.

The engine disclosed in the above-mentioned patent has been designed to create a constantly flowing stream of pressurized air and wherein a first compressor compresses a stream of air channeled to a combustion chamber where it is mixed with fuel, under pressure, and ignited. The ignited combustion gases from the combustion chamber are led to an exhaust chamber and subjected to further compression in a second compressor, from whence they are exhausted. The turbine of the internal combustion engine is aligned with both compressors along a common elongated shaft, whereby the combustion gases generated in the combustion chamber are used to drive the turbine and compressors.

The problem with the otherwise satisfactory internal combustion engine of the above-described patent resides in that the common shaft, on which both compressors and the turbine are mounted in alignment with each other, should be made as a rigid elongated shaft which requires two bearing housings mounted on specially designed struts emplaced within the base of the combustion chamber and at the intake duct of the engine, respectively. Moreover, bearings used in gas turbine engines are typically subjected to high temperature and high pressure. Due to the above-described operation, conditions to which the bearings supporting the shaft of the internal combustion chamber are subject, the bearings can suffer seizure, thermal breakage or similar difficulties because of local overheating. It has been therefore, desired to improve bearing systems for supporting elongated shafts of internal combustion engines or substitute them with different, but more reliable structures.

SUMMARY OF THE INVENTION

It is an object of the present invention to provide an improved internal combustion engine in which the above-described disadvantages will be avoided.

It is another object of the present invention to provide an internal combustion engine with a turbine and compressors supporting shaft which is easy to assemble and inexpensive to make.

According to the present invention, an internal combustion engine is provided, which comprises a first compressor which compresses air which is then mixed with fuel. The compressed mixture that enters the engine is conveyed to a combustion chamber where it is ignited. Condensation products drive a turbine positioned downstream of the combustion chamber. A second compressor which is aligned with the first compressor and the turbine along a common shaft compresses combustion gases which exit into an exhaust chamber through passages or openings formed in an end plate which closes one end of the exhaust chamber and separates the exhaust chamber from the turbine. The common or main shaft of the engine is supported at one end thereof in a bearing housing, whereas its opposite end is secured to the end plate so that a second bearing housing for the shaft is obviated.

BRIEF DESCRIPTION OF THE DRAWINGS

Although such novel feature or features believed to be characteristic of the invention are pointed out in the claims, the invention and the manner in which it may be carried out, may be further understood by reference to the description following and the accompanying drawings.

DETAILED DESCRIPTION OF THE PREFERRED EMBODIMENT

Figure 1:
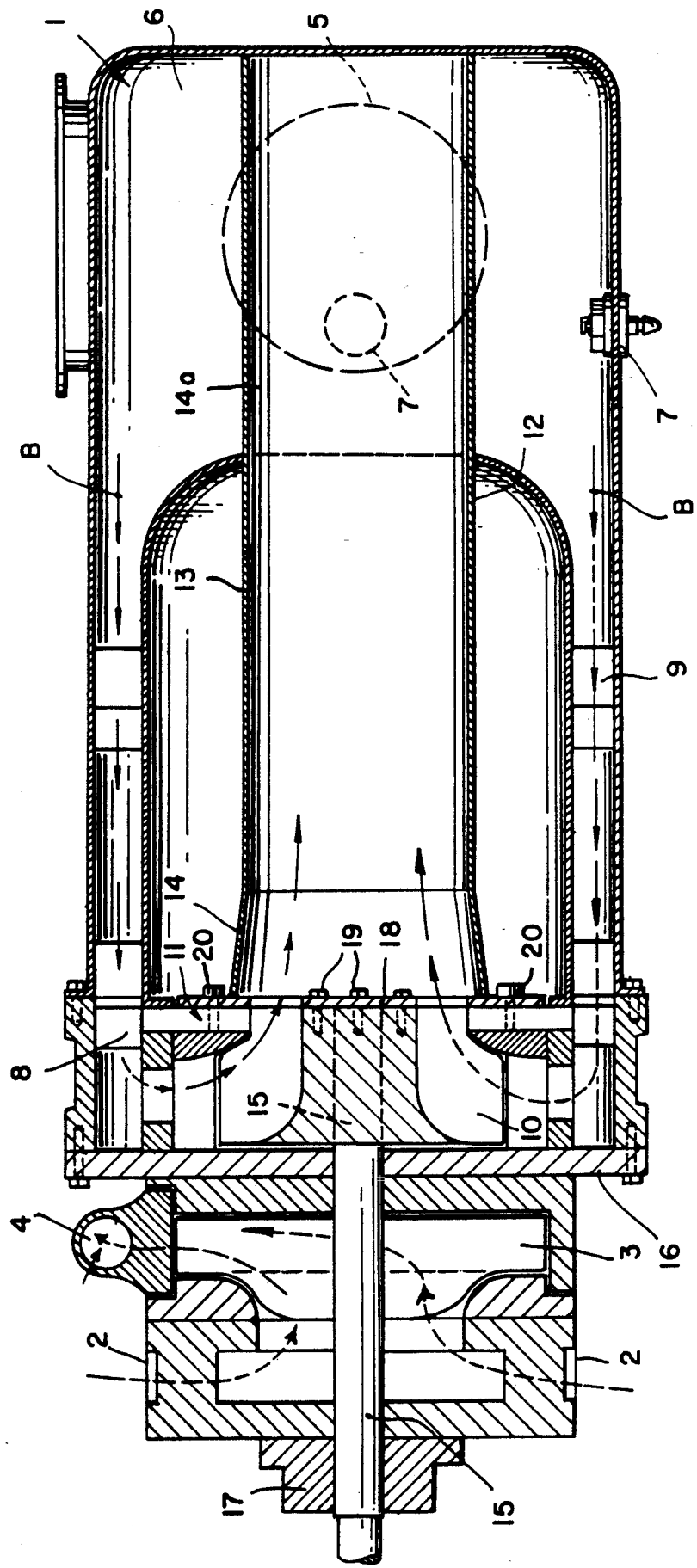
FIG. 1 is a sectional view, partly schematic through an internal combustion engine according to the invention.

Referring now to the figures in greater detail, where like reference numbers denote like parts in the various figures. As best seen in FIG. 1, the engine of the present invention substantially comprises a housing 1 formed preferably of a strong lightweight metal. A stream of air is admitted into housing 1 through an air inlet or duct 2. Air inlets 2 are provided in the preferred embodiment of the invention. The air stream introduced into the housing 1 is compressed by a first compressor 3, which is preferably formed as a centrifugal, axial compressor. The compressed air stream is directed via an air conduit 4 to an air stack (not shown) similarly to that disclosed in applicant's U.S. Pat. No. 3,613,361. The compressed air is mixed in that air stack with fuel, and a fuel and air mixture is conveyed in the known fashion to an inlet 5 of a combustion chamber 6. The combustion chamber 6 is substantially a cylindrical configuration, in which combustion is effected by means of spark plugs 7.

Expansion or combustion gas resulting from combustion of the ignited fuel and air mixture in the combustion chamber 6 flow toward turbine blades 8, a shown by arrow B, so that the turbine blades are driven by the combustion gases. Diffusor vanes 9 are installed at the inner peripheral wall of the housing 1 to regulate the flow of the combustion gases.

A second compressor 10, which is preferably a radial inflow impeller, is positioned downstream from the turbine blades 8 to compress exhaust gases from the turbine 11. The second compressor 10 directs the exhaust gases under pressure into an exhaust chamber designated at reference numeral 12. The exhaust chamber 12 is substantially elongated and of cylindrical configuration. An elongated cylindrical exhaust tube 13 with a substantially frustoconical inlet portion 14 is located centrally through the combustion chamber 6. An end portion 14a of the exhaust tube 13, however, extends outwardly from the exhaust tube 13 through the combustion chamber and terminates at an end wall of the housing 1.

As shown in FIG. 1, both compressors 3 and 10, as well as the turbine 11, are axially aligned along a common shaft 15. A partition plate or wall 16 separates compressor 3 from compressor 10 and turbine 11.

The shaft 15 is mounted at two ends thereof in a bearing housing 17 in a conventional manner and in an end plate 18 to which the end of shaft 15 is secured by bolts 19. The shaft 15 in the internal combustion engine of the present invention is much shorter than that of the U.S. Pat. No. 3,613,361 and does not require a second bearing. Plate 18 is also fastened to the rotor of turbine 11 by bolts 20, whereby a rigid rotatable assembly is provided. Turbine 11 drives shaft 15. As can be readily understood, a conventional starter system is employed for initial actuation of the turbine.

Figure 2:
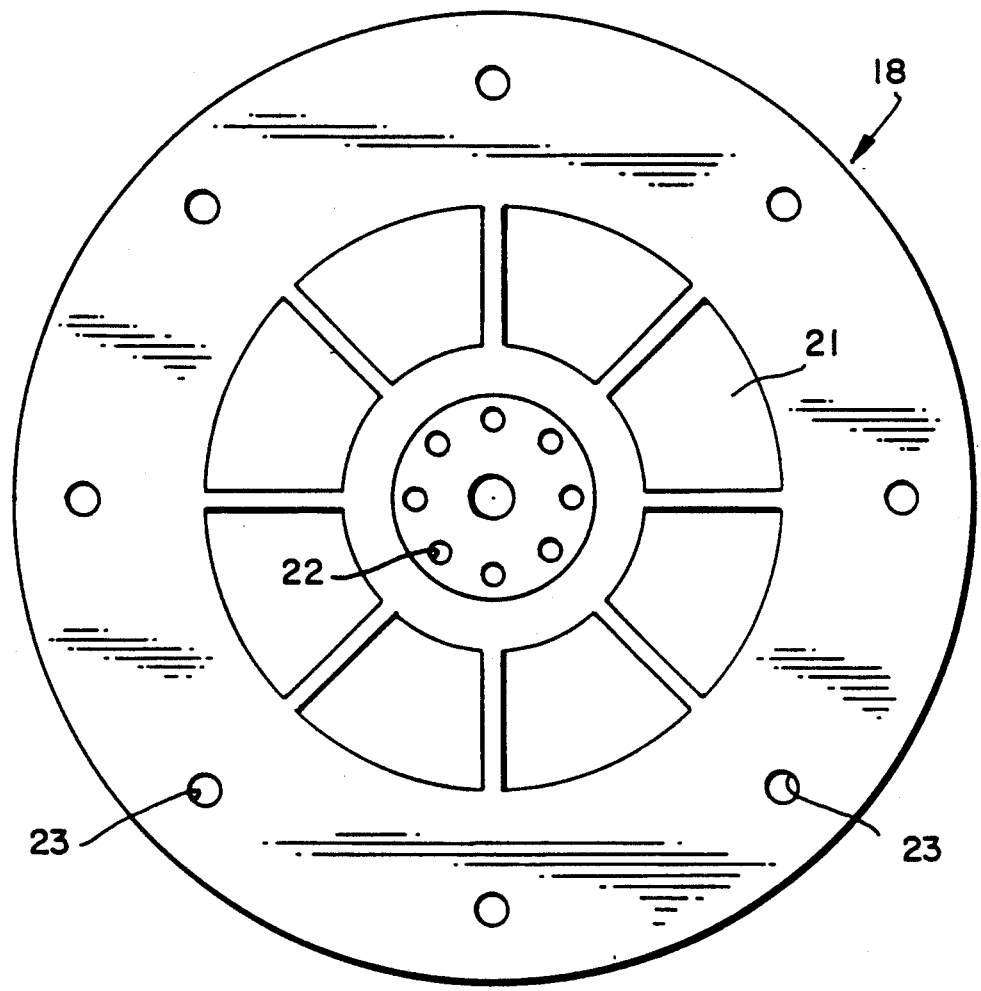
FIG. 2 is a plan view of an end plate for supporting a main shaft of the engine of FIG. 1.
Figure 3:
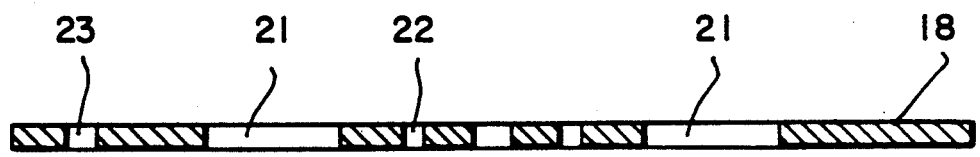
FIG. 3 is a side sectional view of the end plate of FIG. 2.

FIGS. 2 and 3 illustrate end plate 18 in greater detail. End plate 18 is a substantially circular plate fitted in the opening of one end wall of exhaust tube 13 and provided with a plurality of circumferentially spaced apart openings 21 which are spaced radially outwardly towards the peripheral circumference of the plate. A plurality of bores 22 formed in end plate 18 serve the purpose of receiving bolts 19 to fasten the plate to the end face of the shaft 15. Bores 23, provided in the end plate 18 to the rotor of turbine 11. Segment shaped openings 21 are through openings for passing air into the exhaust chamber 12.

Upon rotation of shaft 15, which is driven by turbine blades 8, the impellers of both compressors 3 and 10 are operated. The turbine blades 8 and compressor 10 compress air which passes into the exhaust chamber 12 through openings 21 in the end plate 18, which surrounds shaft 15 and rotates therewith. Energy is available through the end portion 14a of exhaust tube 13.

The compressed burning mixture, compressed by compressor 10 in the engine, according to the present invention, now passes into the exhaust chamber 12 through openings 21 of the end plate 18 and has a direct energy outlet. The outer peripheral wall of the exhaust chamber 12 serves as a guide for guiding the burning mixture towards the turbine blades 8, as shown by arrows B.

The afore-described structure eliminates the need for a second bearing housing to support the main shaft, specifically in the region subjected to the compressed burning fuel air mixture. The shaft is much shorter as compared to conventional structures and therefore is not subjected to full pressure of the compressed burning fuel air mixture as in the U.S. Pat. No. 3,613,361. The exhaust gases outlet is formed now as a straight linear energy conduit.

The terms and expressions which are employed are used as terms of description; it is recognized, though, that various modifications are possible.

It is also understood that the following claims are intended to cover all of the generic and specific features of the invention herein described, and all statements of the scope of the invention which, as a matter of language, might fall therebetween.

Having described certain forms of the invention in some detail, what is claimed is:

1. A turbo-compressor engine for a continuous supply of compressed gases, comprising a first compressor means adapted to compress a body of air and connected to a combustion chamber to pass compressed air thereinto; means to introduce and mix fuel into said compressed air; means to ignite said fuel-air mixture; housing means; an exhaust chamber located in said housing means and defining with said housing means guide means to guide combustion products from said combustion chamber; combustion products turbine means positioned downstream of said combustion means and in communication with said guide means; second compressor means downstream of said turbine means for compressing combustion products and connected to said exhaust chamber, said first and second compressor means and said turbine means being axially aligned on a common shaft, said shaft terminating before said exhaust chamber, and an end plate separating said exhaust chamber from said turbine means, said end plate secured to an end face of said shaft, said turbine means and second compressor means attached to said end plate, forming a rotatable subassembly, and said end plate including openings therethrough adapted to pass combustion products, compressed by second compressor means into said exhaust chamber.

2. The apparatus as claimed in claim 1, and further comprising an elongated exhaust tube extending through said exhaust chamber and outwardly therefrom, said exhaust tube forming a straight linear energy conduit.

3. The apparatus as claimed in claim 1, wherein said first compressor means is a centrifugal impeller.

4. The apparatus as claimed in claim 1, wherein said second compressor means is a radial inflow impeller.

5. The apparatus as claimed in claim 1, wherein said housing means is of a substantially cylindrical configuration.

6. The apparatus as claimed in claim 1, wherein said end plate is circular.

7. The apparatus as claimed in claim 6, wherein said openings are circumferentially spaced from each other and are segment shaped.

* * * * *